United States Patent
Stanton et al.

(10) Patent No.: US 12,087,275 B2
(45) Date of Patent: Sep. 10, 2024

(54) NEURAL-NETWORK-BASED TEXT-TO-SPEECH MODEL FOR NOVEL SPEAKER GENERATION

(71) Applicant: Google LLC, Mountain View, CA (US)

(72) Inventors: Daisy Antonia Stanton, San Francisco, CA (US); Sean Matthew Shannon, San Francisco, CA (US); Soroosh Mariooryad, Redwood City, CA (US); Russell John-Wyatt Skerry-Ryan, Mountain View, CA (US); Eric Dean Battenberg, Walnut Creek, CA (US); Thomas Edward Bagby, Monte Rio, CA (US); David Teh-Hwa Kao, Philadelphia, PA (US)

(73) Assignee: GOOGLE LLC, Mountain View, CA (US)

( * ) Notice: Subject to any disclaimer, the term of this patent is extended or adjusted under 35 U.S.C. 154(b) by 388 days.

(21) Appl. No.: 17/673,417

(22) Filed: Feb. 16, 2022

(65) Prior Publication Data

US 2023/0206898 A1   Jun. 29, 2023

Related U.S. Application Data

(60) Provisional application No. 63/293,384, filed on Dec. 23, 2021.

(51) Int. Cl.
*G10L 13/08* (2013.01)
*G06N 3/08* (2023.01)
*G10L 13/027* (2013.01)

(52) U.S. Cl.
CPC .............. *G10L 13/086* (2013.01); *G06N 3/08* (2013.01); *G10L 13/027* (2013.01)

(58) Field of Classification Search
CPC ........ G10L 13/086; G10L 13/027; G06N 3/08
USPC .......................................... 704/260
See application file for complete search history.

(56) References Cited

U.S. PATENT DOCUMENTS

| | | | | |
|---|---|---|---|---|
| 10,872,598 B2 * | 12/2020 | Arik | ........................ | G10L 25/30 |
| 10,896,669 B2 * | 1/2021 | Arik | ....................... | G10L 15/063 |
| 11,651,763 B2 * | 5/2023 | Arik | ........................ | G10L 13/08 |
| | | | | 704/258 |
| 11,705,107 B2 * | 7/2023 | Arik | ........................ | G10L 25/30 |
| | | | | 704/260 |

(Continued)

OTHER PUBLICATIONS

Ank et al., "Deep Voice 2: Multi-Speaker Neural Text-to-Speech", arXiv:1705.08947v2, Sep. 20, 2017, 15 pages.

(Continued)

*Primary Examiner* — Susan I McFadden
(74) *Attorney, Agent, or Firm* — DORITY & MANNING P.A.

(57) ABSTRACT

Systems and methods for text-to-speech with novel speakers can obtain text data and output audio data. The input text data may be input along with one or more speaker preferences. The speaker preferences can include speaker characteristics. The speaker preferences can be processed by a machine-learned model conditioned on a learned prior distribution to determine a speaker embedding. The speaker embedding can then be processed with the text data to generate an output that includes audio data descriptive of the text data spoken by a novel speaker.

20 Claims, 10 Drawing Sheets

(56) References Cited

U.S. PATENT DOCUMENTS 11,915,683 B2* 2/2024 Gabrys ............... G10L 13/047

OTHER PUBLICATIONS

Arik et al., "Neural Voice Cloning with a Few Samples", arXiv:1802.06006v3, Oct. 12, 2018, 18 pages.

Casanova et al., "SC—GlowTTS: An Efficient Zero-Shot Multi-Speaker Text-To-Speech Model", arXiv preprint arXiv:2104.05557v2, Jun. 15, 2021, 5 pages.

Chen et al., "AdaSpeech: Adaptive Text to Speech for Custom Voice", arXiv:2103.00993v1, Mar. 1, 2021, 10 pages.

Chien et al., "Investigating on Incorporating Pretrained and Learnable Speaker Representations for Multi-Speaker Multi-Style Text-To-Speech", arXiv:2103.04088v5, May 1, 2021, 5 pages.

Choi et al., "Attentron: Few-Shot Text-To-Speech Utilizing Attention-Based Variable-Length Embedding", arXiv:2005.08484v2, Aug. 12, 2020, 5 pages.

Chou et al., "One-Shot Voice Conversion by Separating Speaker and Content Representations with Instance Normalization", arXiv:1904.05742v4, Aug. 22, 2019, 6 pages.

Cooper et al., "Zero-Shot Multi-Speaker Text-To-Speech with State-Of-The-Art Neural Speaker Embeddings", arXiv:1910.10838v2, Feb. 4, 2020, 5 pages.

Damianou et al., "Deep Gaussian Processes", arXiv:1211.0358v2, Mar. 23, 2013, 9 pages.

De Cao et al., "The Power Spherical Distribution", arXiv:2006.04437v2, Jun. 15, 2020, 9 pages.

Dehak et al., "Front-End Factor Analysis for Speaker Verification," IEEE Transactions on Audio, Speech, and Language Processing, vol. 19, No. 4, pp. 788-798, May 4, 2011, 11 pages.

Higgins et al., "VAE: Learning Basic Visual Concepts with a Constrained Variational Framework," International Conference on Learning Representations, Apr. 24-27, 2017, 15 pages.

Kalchbrenner et al., "Efficient Neural Audio Synthesis", arXiv:1802.08435v2, Jun. 25, 2018, 10 pages.

Kingma et al., "Adam: A Method for Stochastic Optimization," arXiv:1412.6980v9, Jan. 30, 2017, 15 pages.

Kingma et al., "Auto-Encoding Variational Bayes", arXiv:1312.6114v10, May 1, 2014, 14 pages.

Mitsui et al., "Deep Gaussian Process Based Multi-Speaker Speech Synthesis with Latent Speaker Representation", arXiv:2008.02950v1, Aug. 7, 2020, 5 pages.

Moss et al., "BOFFIN TTS: Few-Shot Speaker Adaptation by Bayesian Optimization", arXiv:2002.01953v1, Feb. 4, 2020, 5 pages.

Nowozin et al., "f-GAN: Training Generative Neural Samplers Using Variational Divergence Minimization," in Advances in Neural Information Processing Systems, 2016, pp. 271-279, 9 pages.

Poole et al., "Improved Generator Objectives for GANs," NIPS Workshop on Adversarial Training, 2016, Barcelona, Spain, 8 pages.

Rezende et al., "Taming VAEs," arXiv preprint arXiv:1810.00597v1, Oct. 1, 2018, 21 pages.

Shannon, "Properties of F-Divergences and F-GAN Training", arXiv:2009.00757v1, Sep. 2, 2020, 18 pages.

Shen et al., "Natural TTS Synthesis by Conditioning Wavenet on Mel Spectrogram Predictions", arXiv:1712.05884v2, Feb. 16, 2018, 5 pages.

Snyder et al., "X-Vectors: Robust DNN Embeddings for Speaker Recognition", International Conference on Acoustic, Speech and Signal Processing, 2018, 5 pages.

Van den Oord et al., "WaveNet: A Generative Model for Raw Audio", arXiv:1609.03499v2, Sep. 16, 2016, 15 pages.

Variani et al., "Deep Neural Networks for Small Footprint Text-Dependent Speaker Verification", IEEE International Conference on Acoustic, Speech and Signal Processing, 2014, 5 pages.

Wang et al., "Tacotron: Towards End-to-End Speech Synthesis", arXiv:1703.10135v2, Apr. 6, 2017, 10 pages.

Wang et al., "What Does the Speaker Embedding Encode?", Interspeech, 2017, pp. 1497-1501, 5 pages.

Zen et al., "Statistical Parametric Speech Synthesis Using Deep Neural Networks", IEEE International Conference on Acoustics, Speech, and Signal Processing, 2013, pp. 7962-7966, 5 pages.

Zhang et al., "Transfer Learning from Speaker Verification to Multispeaker Text-To-Speech Synthesis", arXiv:1806.04558v4, Jan. 2, 2019, 15 pages.

* cited by examiner

NEURAL-NETWORK-BASED TEXT-TO-SPEECH MODEL FOR NOVEL SPEAKER GENERATION

RELATED APPLICATIONS

This application claims priority to and the benefit of U.S. Provisional Patent Application No. 63/293,384, filed Dec. 23, 2021. U.S. Provisional Patent Application No. 63/293,384 is hereby incorporated by reference in its entirety.

FIELD

The present disclosure relates generally to audio data generation with a machine-learned model. More particularly, the present disclosure relates to the generation of audio data descriptive of a speaker different from the plurality of speakers used in training a machine-learned model in which audio data can be generated based on a learned distribution associated with a learned embedding space.

BACKGROUND

Performing text-to-speech tasks can involve synthesizing known voices for generating audio outputs. For example, the text-to-speech task may be performed using a machine-learned model trained on a set of speakers. The set of speakers may then have their voices utilized for future text-to-speech tasks. However, the existing systems and methods fail to be able to perform the text-to-speech task with novel speakers not found in the training corpus of speakers.

Adding new voices to these models can be time consuming and laborious, requiring recording sessions in a studio-quality environment with human voice actors before a model can be retrained or fine-tuned. Moreover, the collection and retraining of models to add new speakers to a corpus of usable speakers can be taxing on both human resources and computational resources.

SUMMARY

Aspects and advantages of embodiments of the present disclosure will be set forth in part in the following description, or can be learned from the description, or can be learned through practice of the embodiments.

One example aspect of the present disclosure is directed to a computing system for novel speaker generation. The computing system can include one or more processors and one or more non-transitory computer-readable media that collectively store instructions that, when executed by the one or more processors, cause the computing system to perform operations. The operations can include obtaining input data. The input data can include text data associated with a phoneme sequence. The operations can include determining a speaker embedding from an embedding space having a learned distribution. The speaker embedding can be representative of a desired speaker. In some implementations, the speaker embedding can differ from each of a plurality of training embeddings, and the plurality of training embeddings can be associated with a plurality of training datasets used for training a text-to-speech model. The operations can include processing the text data and the speaker embedding with a generation model of the text-to-speech model to generate output data. In some implementations, the output data can include audio data descriptive of the phoneme sequence spoken by the desired speaker.

Another example aspect of the present disclosure is directed to a computer-implemented method. The method can include obtaining, by a computing system including one or more processors, a training dataset. In some implementations, the training dataset can include training text data, training audio data associated with the training text data, and a speaker label associated with the training audio data. The method can include processing, by the computing system, the training audio data with an embedding model to generate a speaker embedding in an embedding space and processing, by the computing system, the training text data and the speaker embedding with a generation model to generate a training output. In some implementations, the training output can include output audio data. The method can include evaluating, by the computing system, a loss function that evaluates a difference between the training audio data and the output audio data and adjusting, by the computing system, one or more parameters of at least one of the embedding model or the generation model based at least in part on the loss function. In some implementations, the method can include determining, by the computing system, a prior distribution based at least in part on the speaker embedding in the embedding space and the speaker label. The speaker label can include one or more speaker characteristics associated with a speaker.

Another example aspect of the present disclosure is directed to one or more non-transitory computer-readable media that collectively store instructions that, when executed by one or more computing devices, cause the one or more computing devices to perform operations. The operations can include obtaining an input dataset. The input dataset can include phoneme data and speaker metadata. The operations can include processing the speaker metadata with a first machine learned model to determine a speaker embedding in a learned embedding space and processing the phoneme data and the speaker embedding with a second machine-learned model to generate predicted speech data. The operations can include providing the predicted speech data. In some implementations, the predicted speech data can include data descriptive of one or more sound waves, and the predicted speech data can differ from a plurality of training speech datasets associated with a plurality of training datasets used to train the first machine-learned model and the second machine-learned model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
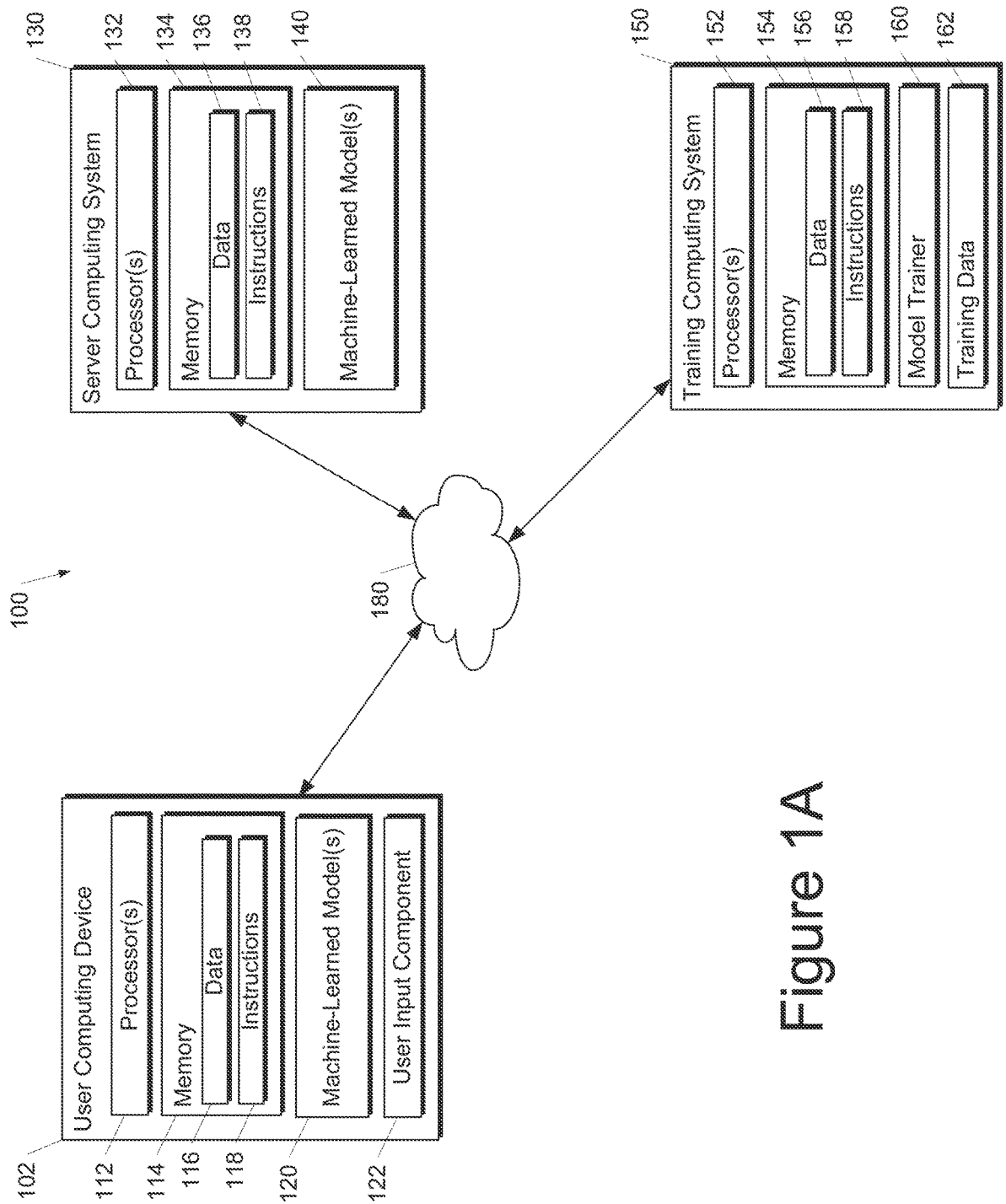
FIG. 1A depicts a block diagram of an example computing system that performs novel speaker generation according to example embodiments of the present disclosure.

Reference numerals that are repeated across plural figures are intended to identify the same features in various implementations.

DETAILED DESCRIPTION

Overview

Generally, the present disclosure is directed to systems and methods for training one or more machine-learned models to synthesize speech in human-sounding voices. The systems and methods can leverage a deep neural-network-based text-to-speech model that learns a distribution over a speaker embedding space, which can enable sampling of novel and diverse speakers.

The systems and methods can include obtaining a training dataset. The training dataset can include a plurality of speech datasets. A first speech dataset of the plurality of speech datasets can be processed with a first model (e.g., an embedding model) to generate a first embedding in an embedding space. The first embedding can be processed with a second model (e.g., a generation model) to generate first synthesized speech data. The systems and methods can then include evaluating a loss function that evaluates a difference between the first synthesized speech data and the first speech dataset and adjusting one or more parameters of at least one of the first model or the second model based at least in part on the loss function.

The trained first model and the trained second model can then be utilized for generating speech data with synthetic speakers not in the training dataset. For example, the systems and methods can obtain utterance data (e.g., a phoneme sequence) and speaker metadata. In some implementations, the speaker metadata can include user-selected features associated with desired speaker characteristics. The speaker metadata can be processed with the first model (e.g., a machine-learned embedding model) to generate a speaker embedding. The speaker embedding and the utterance data can then be processed with the second model to generate a predicted speech output.

The systems and methods disclosed herein can include obtaining input data. The input data can include text data associated with a phoneme sequence (e.g., one or more words). The systems and methods can include determining a speaker embedding from an embedding space having a learned distribution. The speaker embedding can be representative of a desired speaker. In some implementations, the speaker embedding can differ from each of a plurality of training embeddings. The plurality of training embeddings can be associated with a plurality of training datasets used for training a text-to-speech model. The text data and the speaker embedding can then be processed with a generation model of the text-to-speech model to generate output data, wherein the output data comprises audio data descriptive of the phoneme sequence spoken by the desired speaker.

The systems and methods can obtain input data. The input data can include text data associated with a phoneme sequence. The phoneme sequence can be descriptive of one or more words. Additionally and/or alternatively, the input data can include one or more desired speaker characteristics. The input data may be obtained from a user computing device.

A speaker embedding from an embedding space can be determined based at least in part on a learned distribution for the embedding space. In some implementations, a learned distribution of an embedding space can be sampled to determine a speaker embedding. The speaker embedding can be representative of a desired speaker. In some implementations, the speaker embedding can differ from each of a plurality of training embeddings. The plurality of training embeddings can be associated with a plurality of training datasets used for training a text-to-speech model.

In some implementations, the learned distribution can include a plurality of speaker characteristics learned based on a plurality of speaker labels. The input data can include one or more desired speaker characteristics associated with a particular speaker characteristic of the plurality of speaker characteristics. Additionally and/or alternatively, determining the speaker embedding can include sampling from a subset of the embedding space. The subset of the embedding space can include one or more training embeddings associated with one or more training datasets associated with the particular speaker characteristic. In some implementations, the plurality of speaker characteristics can include a gender of a speaker, a geographic region associated with the speaker, and a language spoken by the speaker. Additionally and/or alternatively, the particular speaker characteristic can include at least one of a particular speaker gender, a particular speaker geography, or a particular speaker language.

In some implementations, determining the speaker embedding can include sampling conditioned based at least in part on a learned characteristic in the learned distribution.

In some implementations, the learned distribution can be learned jointly with the training of the text-to-speech model. Additionally and/or alternatively, the text-to-speech model can include a neural-network-based text-to-speech model that has been trained with a training dataset that may include a plurality of speech datasets associated with one or more speech utterances. In some implementations, the text-to-speech model may have been trained with the plurality of training datasets, in which the plurality of training datasets may include a plurality of speech datasets associated with a plurality of different speakers.

The text data and the speaker embedding can then be processed with a generation model of the text-to-speech model to generate output data. In some implementations, the output data can include audio data descriptive of the phoneme sequence spoken by a desired speaker. Additionally and/or alternatively, the output data can be descriptive of the particular speaker characteristic.

In some implementations, the systems and methods can include evaluating one or more distance functions (e.g., a distance function associated with a nearest neighbor distance) between the output data and one or more known outputs associated with one or more neighbor embeddings in the embedding space. The one or more neighbor embeddings may be located in a region of the embedding space that can include the speaker embedding.

In some implementations, the systems and methods can condition the sampling based on a user-input. For example, the systems and methods can include obtaining an input dataset. The input dataset can include phoneme data and speaker metadata. The speaker metadata can be processed with a first machine learned model to determine a speaker embedding in a learned embedding space. The phoneme data and the speaker embedding can then be processed with a second machine-learned model to generate predicted speech data. The predicted speech data can then be provided (e.g., via a mel spectrogram displayed on a user computing device or via speakers of a user computing device). The predicted speech data can include data descriptive of one or more sound waves. In some implementations, the predicted speech data can differ from a plurality of training speech examples associated with a plurality of training datasets used to train one or more machine-learned models (e.g., the first machine-learned model and the second machine-learned model).

Although the example implementations disclosed above include a first machine-learned model and a second machine-learned model, in some implementations, the functions of the first machine-learned model and a second-machine-learned model may be performed by a singular machine-learned model. The machine-learned model can be trained simultaneously for determining a speaker embedding and generating predicted speech data based on the speaker embedding.

For example, the speaker metadata can be processed with a machine-learned model to determine a speaker embedding in a learned embedding space. The phoneme data and the speaker embedding can then be processed with the same (or a second, separately-trained) machine-learned model to generate predicted speech data.

The systems and methods can include obtaining an input dataset. In some implementations, the input dataset can include phoneme data and speaker metadata. The phoneme data can be descriptive of a phoneme sequence associated with one or more words. Additionally and/or alternatively, the speaker metadata can be descriptive of one or more desired speaker characteristics. In particular, the speaker metadata can include user-selected data associated with a desired speaker. For example, the user may input a text string that they want to be read by a speaker with one or more specific characteristics. The speaker characteristics may include gender of the speaker, region of speaker, primary language of the speaker, age of the speaker, voice pitch of the speaker, etc. Additionally and/or alternatively, the speaker metadata can include language data, region data, and gender data.

In some implementations, the speaker metadata can be processed with a first machine learned model to determine a speaker embedding in a learned embedding space. The speaker embedding can be associated with a region of the embedding space that has been notated as being associated with the desired speaker characteristic. Additionally and/or alternatively, the speaker embedding may differ from the one or more embeddings generated during the training of the machine-learned model based on a training dataset. In some implementations, the first machine-learned model can include an embedding model of a neural-network-based text-to-speech model.

The phoneme data and the speaker embedding can then be processed with a second machine-learned model to generate predicted speech data. The second machine-learned model can include a generation model of a neural-network-based text-to-speech model.

In some implementations, the systems and methods can include providing the predicted speech data. The predicted speech data can include data descriptive of one or more sound waves. Additionally and/or alternatively, the predicted speech data can differ from a plurality of training speech examples associated with a plurality of training datasets used to train the first machine-learned model and the second machine-learned model.

In some implementations, the predicted speech data can include audio frequency data (e.g., a mel spectrogram representation). The audio frequency data may differ from a plurality of training audio frequency datasets associated with a plurality of training datasets used to train the first machine-learned model and the second machine-learned model. In some implementations, the audio frequency data can be processed with a neural vocoder to convert the output into the time domain.

Training of the text-to-speech model can involve obtaining a training dataset. The training dataset can include training text data, training audio data associated with the training text data, and a speaker label (e.g., one or more speaker metadata labels descriptive of an identification, a gender, a locale, etc.) associated with the training audio data. The training audio data can be processed with an embedding model to generate a speaker embedding in an embedding space. The training text data and the speaker embedding can be processed with a generation model to generate a training output. In some implementations, the training output can include output audio data. The systems and methods can then include evaluating a loss function that evaluates a difference between the training audio data (e.g., training audio frequency data such as training mel spectrogram data) and the output audio data (e.g., predicted audio frequency data such as predicted mel spectrogram data). For example, the loss function for the speaker generation system may compute a loss over {training, predict} audio-based features (e.g., frequency-based features and/or intermediate features such as mel spectrogram features). One or more parameters of at least one of the embedding model or the generation model can be adjusted based at least in part on the loss function. A prior distribution over speaker embeddings can be determined based at least in part on the speaker embeddings in the embedding space and the speaker labels (e.g., speaker metadata labels). The speaker label can include one or more speaker characteristics associated with a speaker (e.g., the speaker label can be descriptive of a gender, locale, identification, and/or primary language).

The systems and methods for training a neural-network-based text-to-speech model can include obtaining a training dataset. The training dataset can include training text data, training audio data associated with the training text data, and a speaker label associated with the training audio data. In some implementations, the training dataset can include a target mel spectrogram, a training utterance, an utterance-level conditioning input, and speaker metadata. In some implementations, the training text data can include an utterance-level conditioning input, and the utterance-level conditioning input may include auxiliary data comprising stress markings. Additionally and/or alternatively, the speaker label can include speaker metadata, and the speaker metadata may include a language associated with the training audio data. In some implementations, the speaker label can include speaker metadata, and the speaker metadata may include a gender and/or a regional accent of a speaker associated with the training audio data.

The training audio data can then be processed with an embedding model to generate a speaker embedding in an embedding space. The speaker embedding can include one or more latent feature vectors. In some implementations, the speaker embedding may be annotated with the speaker label.

In some implementations, the training text data and the speaker embedding can be processed with a generation model to generate a training output. The training output can include output audio data. In some implementations, the training output can include mel spectrogram data that can be compared to training mel spectrogram data to calculate a loss function whose gradient can be used to backpropagate error to the machine-learned models.

The systems and methods can include evaluating a loss function that evaluates a difference between the training audio data and the output audio data. In some implementations, the loss function can include a deterministic loss associated with a fixed-variance isotropic Laplace output distribution.

Additionally and/or alternatively, the systems and methods can include adjusting one or more parameters of at least one of the embedding model or the generation model based at least in part on the loss function. In some implementations, adjusting the one or more parameters can be based at least in part on optimization of a log likelihood associated with a speaker embedding prior.

The systems and methods can include determining a prior distribution (e.g., a parameterized prior distribution) based at least in part on the speaker embeddings in the embedding space and the speaker metadata (e.g., a speaker label descriptive of the speaker metadata). In some implementations, the speaker label may include one or more speaker characteristics associated with a speaker. The prior distribution can model the probability of embeddings in the embedding space. In some implementations, the prior distribution can conditionally model the probability of shared speaker characteristics (e.g., gender of speaker, geographic region of speaker, primary language of speaker, age of speaker, voice pitch of speaker, etc.).

The systems and methods of the present disclosure provide a number of technical effects and benefits. As one example, the system and methods can train a text-to-speech model to generate audio data from novel speakers. More specifically, the systems and methods disclosed herein can sample from a learned prior distribution associated with an embedding space to determine a speaker embedding that can be used to generate human-sounding speech without selecting an embedding associated with a known speaker. The determined speaker embedding can then be processed by the generation model of a neural-network-based text-to-speech model to generate the output audio data, which can be descriptive of a novel voice not found in the training dataset for the machine-learned model.

Another technical benefit of the systems and methods of the present disclosure is the ability to train the text-to-speech model to generate embeddings in an embedding space and learn a prior distribution simultaneously. More specifically, the systems and methods can learn an embedding space and can learn a prior distribution simultaneously. Moreover, in some implementations, the systems and methods can utilize a stop gradient to ensure the learning of the prior distribution does not affect the learning of the speaker embedding space.

Another example technical effect and benefit relates to the reduction of computational cost and computational time. The systems and methods disclosed herein can train a machine-learned model to learn and utilize a prior distribution in order to generate audio outputs with novel speaker synthesis. Therefore, the systems and methods can allow for the use of novel speakers outside of the training dataset to be used, which can reduce or eliminate the need to record new voices and retrain the machine-learned models just to utilize more voices.

With reference now to the Figures, example embodiments of the present disclosure will be discussed in further detail.

Example Devices and Systems

FIG. 1A depicts a block diagram of an example computing system 100 that performs novel speaker text-to-speech generation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more neural-network-based text-to-speech models 120. For example, the neural-network-based text-to-speech models 120 can be or can otherwise include various machine-learned models such as neural networks (e.g., deep neural networks) or other types of machine-learned models, including non-linear models and/or linear models. Neural networks can include one or more feed-forward neural networks, recurrent neural networks (e.g., long short-term memory recurrent neural networks), convolutional neural networks, and/or other forms of neural networks. Example neural-network-based text-to-speech models 120 are discussed with reference to FIGS. 2-5.

In some implementations, the one or more neural-network-based text-to-speech models 120 can be received from the server computing system 130 over network 180, stored in the user computing device memory 114, and then used or otherwise implemented by the one or more processors 112. In some implementations, the user computing device 102 can implement multiple parallel instances of a single neural-network-based text-to-speech model 120 (e.g., to perform parallel text-to-speech output generation across multiple instances of input text data).

More particularly, the neural-network-based text-to-speech model can intake input data descriptive of text data and can output output data descriptive of audio data reciting at least a portion of the text of the text data. The neural-network-based text-to-speech model can be trained to learn an embedding space and can be trained to learn a prior distribution associated with an embedding space. The neural-network-based text-to-speech model can sample an embedding from the embedding space based at least in part on the learned prior distribution, which can allow the model to sample an embedding not found in the training dataset but includes one or more characteristics desired by a user.

Additionally or alternatively, one or more neural-network-based text-to-speech models 140 can be included in or otherwise stored and implemented by the server computing system 130 that communicates with the user computing device 102 according to a client-server relationship. For example, the neural-network-based text-to-speech models 140 can be implemented by the server computing system 140 as a portion of a web service (e.g., a text-to-speech service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned neural-network-based text-to-speech models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, the gradient of a loss function can be backpropagated through the model(s) to update one or more parameters of the model(s). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the neural-network-based text-to-speech models 120 and/or 140 based on a set of training data 162. The training data 162 can include, for example, text data, audio data associated with the text data, and speaker labels associated with the speakers in the audio data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
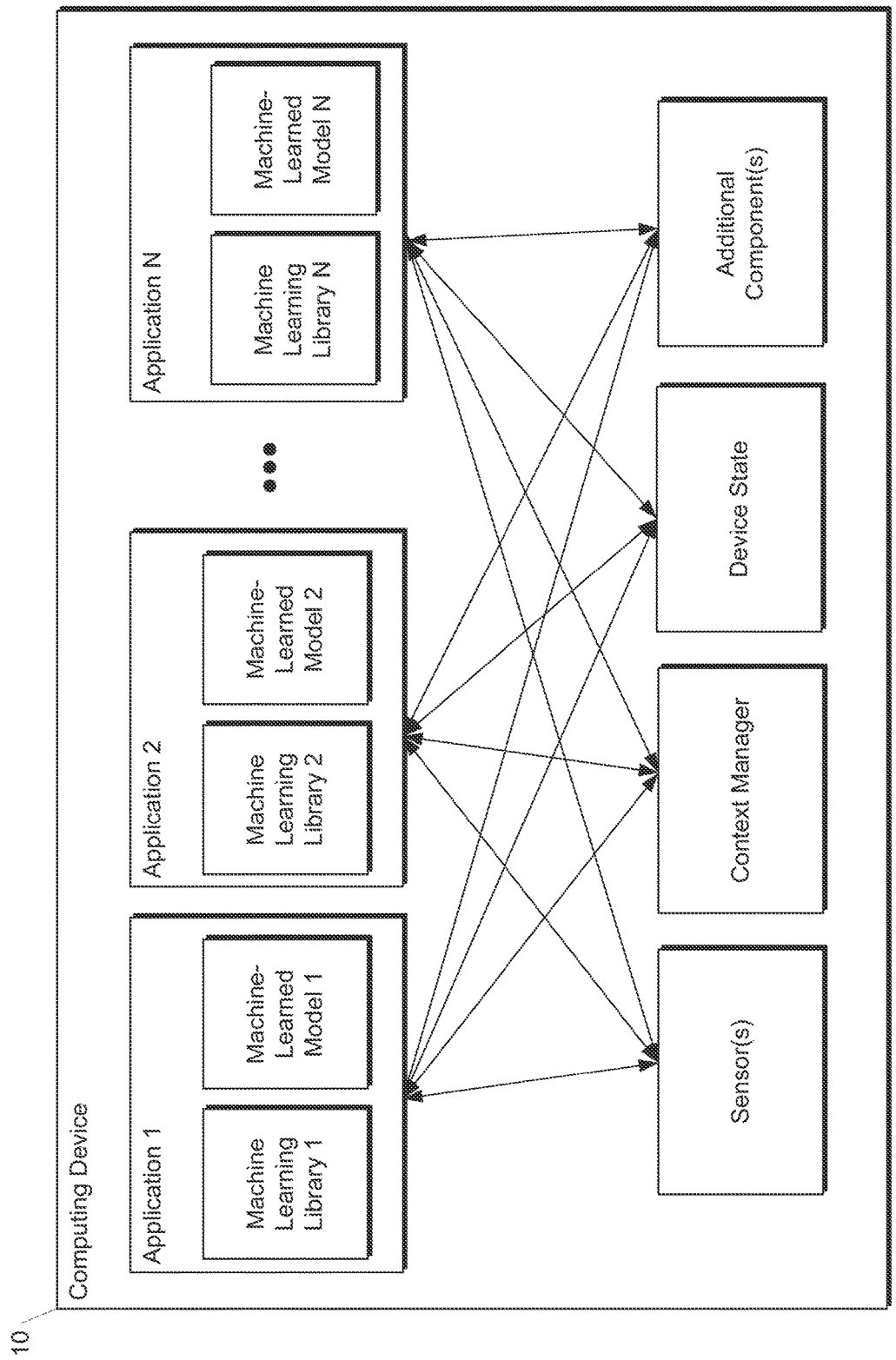
FIG. 1B depicts a block diagram of an example computing device that performs novel speaker generation according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
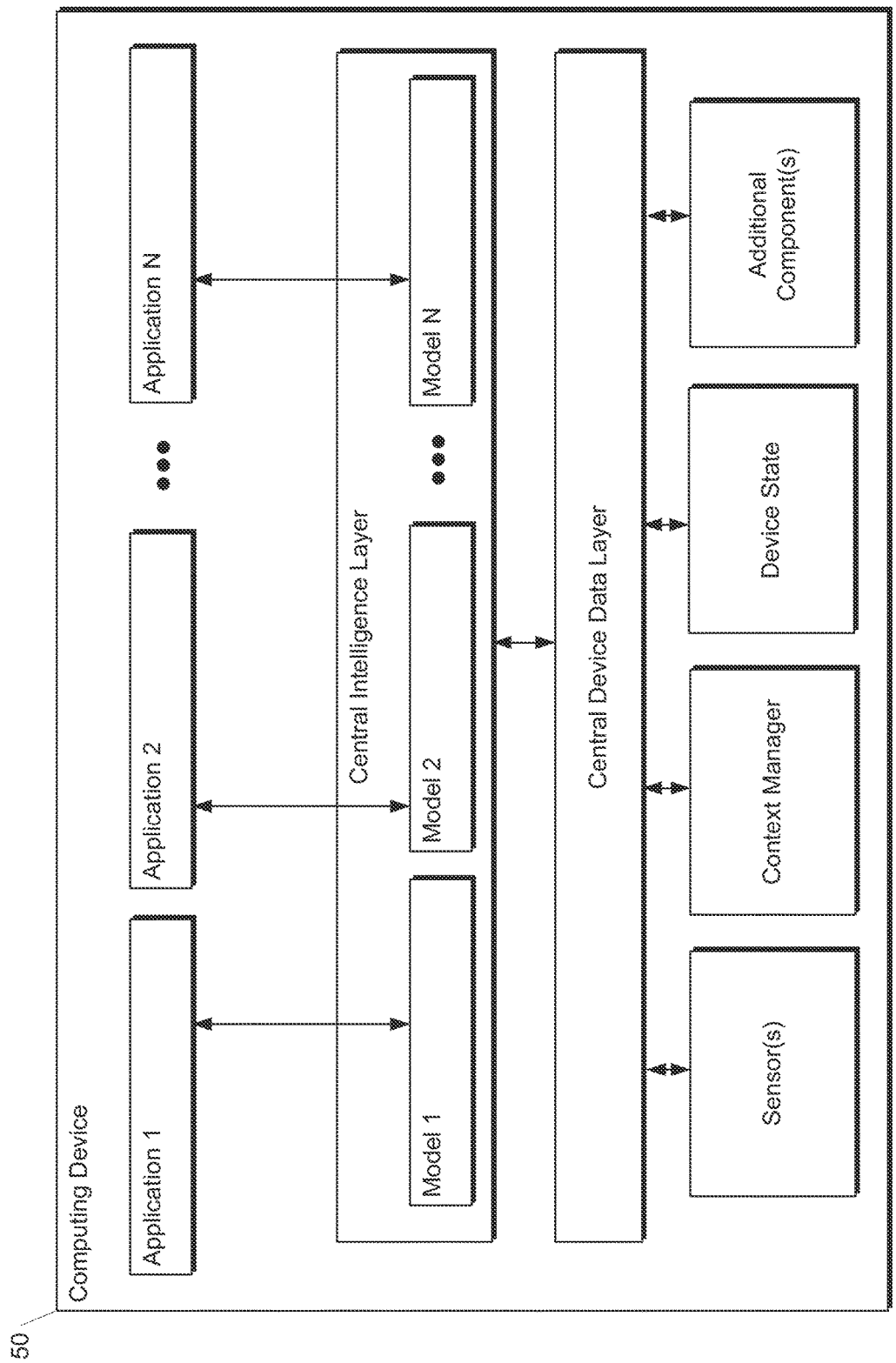
FIG. 1C depicts a block diagram of an example computing device that performs novel speaker generation according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
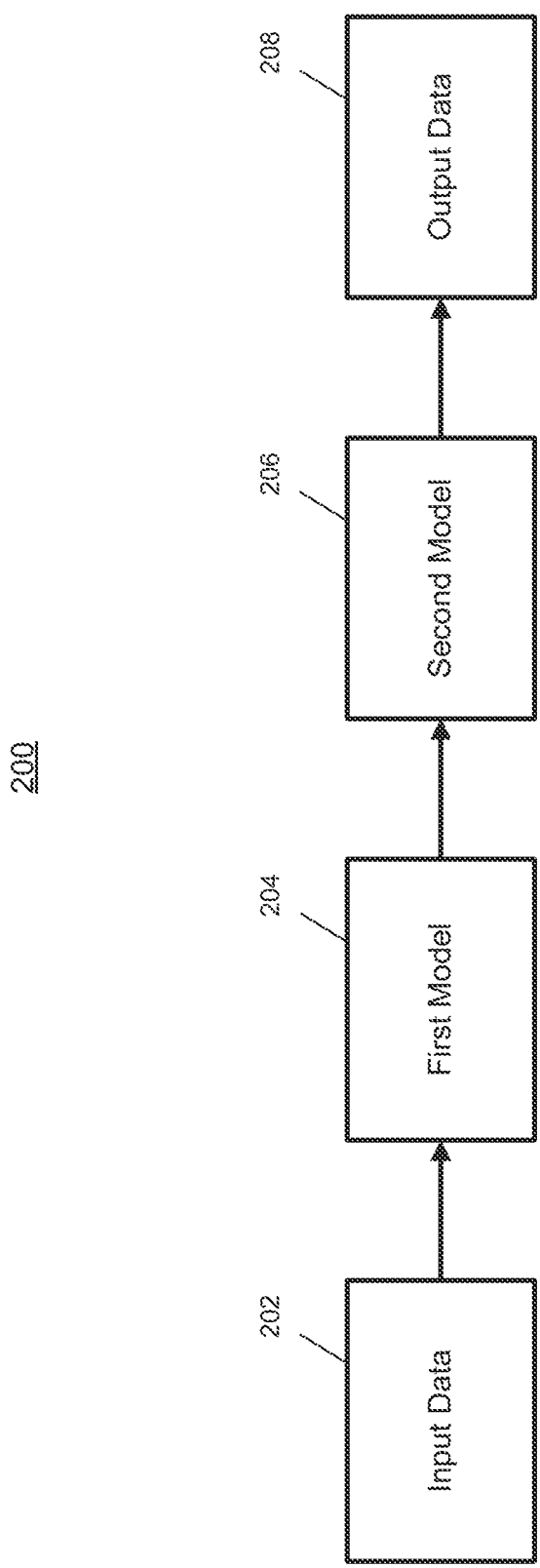
FIG. 2 depicts a block diagram of an example neural-network-based text-to-speech model according to example embodiments of the present disclosure.

FIG. 2 depicts a block diagram of an example neural-network-based text-to-speech model 200 according to example embodiments of the present disclosure. In some implementations, the neural-network-based text-to-speech model 200 is trained to receive a set of input data 202 descriptive of a phoneme sequence and/or one or more speaker characteristics and, as a result of receipt of the input data 202, provide output data 208 that is descriptive of audio including the phoneme spoken by a speaker having the specified speaker characteristics. Thus, in some implementations, the neural-network-based text-to-speech model 200 can include a first model 204 that is operable to determine a particular speaker embedding to use from the embedding space and a second model 206 that is operable to generate the output data 208 based on the phoneme sequence and the particular speaker embedding.

For example, the input data 202 can include a text string including "Hello World." In some implementations, the input data can further include speaker metadata descriptive of desired speaker characteristics. For example, the speaker metadata can include an input specifying a desired speaker gender, desired region, and/or training speaker or novel speaker preference (e.g., the input data 202 can include "Hello World" gender=female, region=en/gb, speaker=<novel speaker in the training set>).

In some implementations, the input data 202 can be processed by the first model 204 to determine a speaker embedding. For example, the input data 202 can be processed by the first model 204 to output a speaker embedding descriptive of a female from the United Kingdom not found in the training speaker dataset. Alternatively and/or additionally, the output speaker embedding may be a novel speaker embedding randomly sampled from a learned distribution of an embedding space in response to speaker metadata not being provided.

The speaker embedding and the phoneme sequence can be processed by the second model 206 to generate output data 208. For example, the second model may process the text "Hello World" and the speaker embedding descriptive of the female from the United Kingdom not found in the training speaker dataset to generate audio data descriptive of "Hello World" spoken by a novel speaker with speaker characteristics associated with a female from the United Kingdom.

The output data 208 may include mel spectrogram data descriptive of the novel speaker speaking the phoneme sequence. The output data 208 can include audio data that can be utilized to instruct a speaker to play a sound descriptive of the novel speaker speaking the phoneme sequence.

The first model 204 can include an embedding model that can leverage a learned embedding space and a learned prior distribution of the embedding space to sample the learned distribution, and in turn the embedding space, to determine a speaker embedding to utilize for a text-to-speech task.

The second model 206 can include a generation model trained to generate audio data (e.g., mel spectrogram data) based on a phoneme sequence and/or a speaker embedding.

Figure 3:
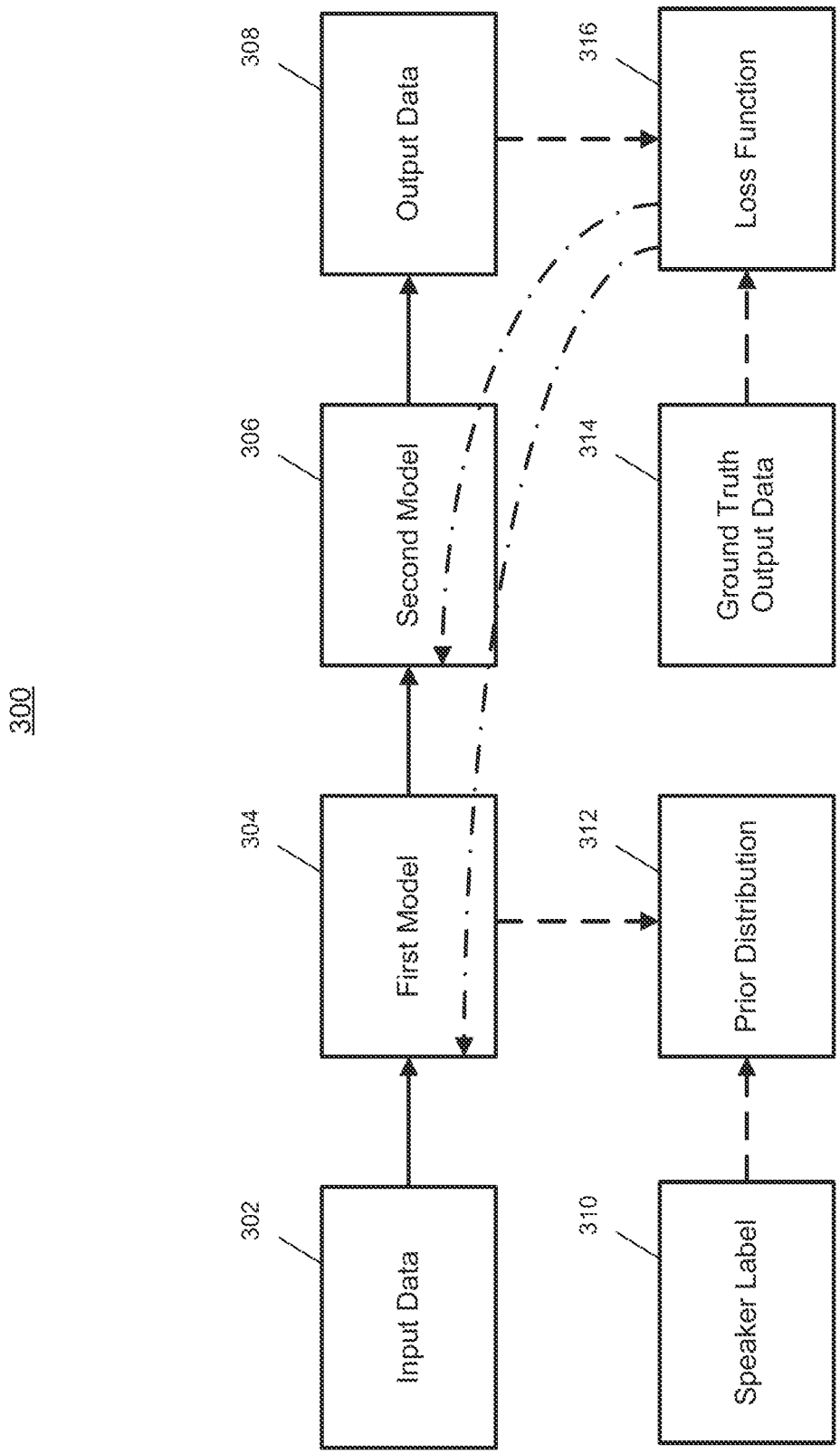
FIG. 3 depicts a block diagram of an example neural-network-based text-to-speech model according to example embodiments of the present disclosure.

FIG. 3 depicts a block diagram of an example neural-network-based text-to-speech model 300 according to example embodiments of the present disclosure. The neural-network-based text-to-speech model 300 is similar to the neural-network-based text-to-speech model 200 of FIG. 2 except that the neural-network-based text-to-speech model 300 of FIG. 3 is being trained based at least in part on one or more speaker labels 310 and ground truth output data 314.

In particular, FIG. 3 depicts a block diagram of an example neural-network-based text-to-speech model 300 according to example embodiments of the present disclosure. In some implementations, the neural-network-based text-to-speech model 300 is trained to receive a set of input data 302 descriptive of a phoneme sequence and/or audio data and, as a result of receipt of the input data 302, provide output data 308 that is descriptive of audio including the phoneme spoken by a speaker of the audio data. Thus, in some implementations, the neural-network-based text-to-speech model 300 can include a first model 304 that is operable to generate embeddings in an embedding space and a second model 306 that is operable to generate the output data 308 based on the phoneme sequence and the particular speaker embedding.

The generated output data 308 can be compared to ground truth output data 314. The comparison can be utilized to evaluate a loss function 316, which can output a gradient descent. The gradient descent can then be backpropagated to the first model 304 and/or the second model 306 to adjust one or more parameters of the machine-learned model(s).

Additionally and/or alternatively, the particular speaker embedding output by the first model 304 and one or more speaker labels 310 may be processed to learn a prior distribution 312 associated with the speaker and the embedding space. In some implementations, the particular speaker embedding may be annotated with the one or more speaker labels 310.

Figure 4:
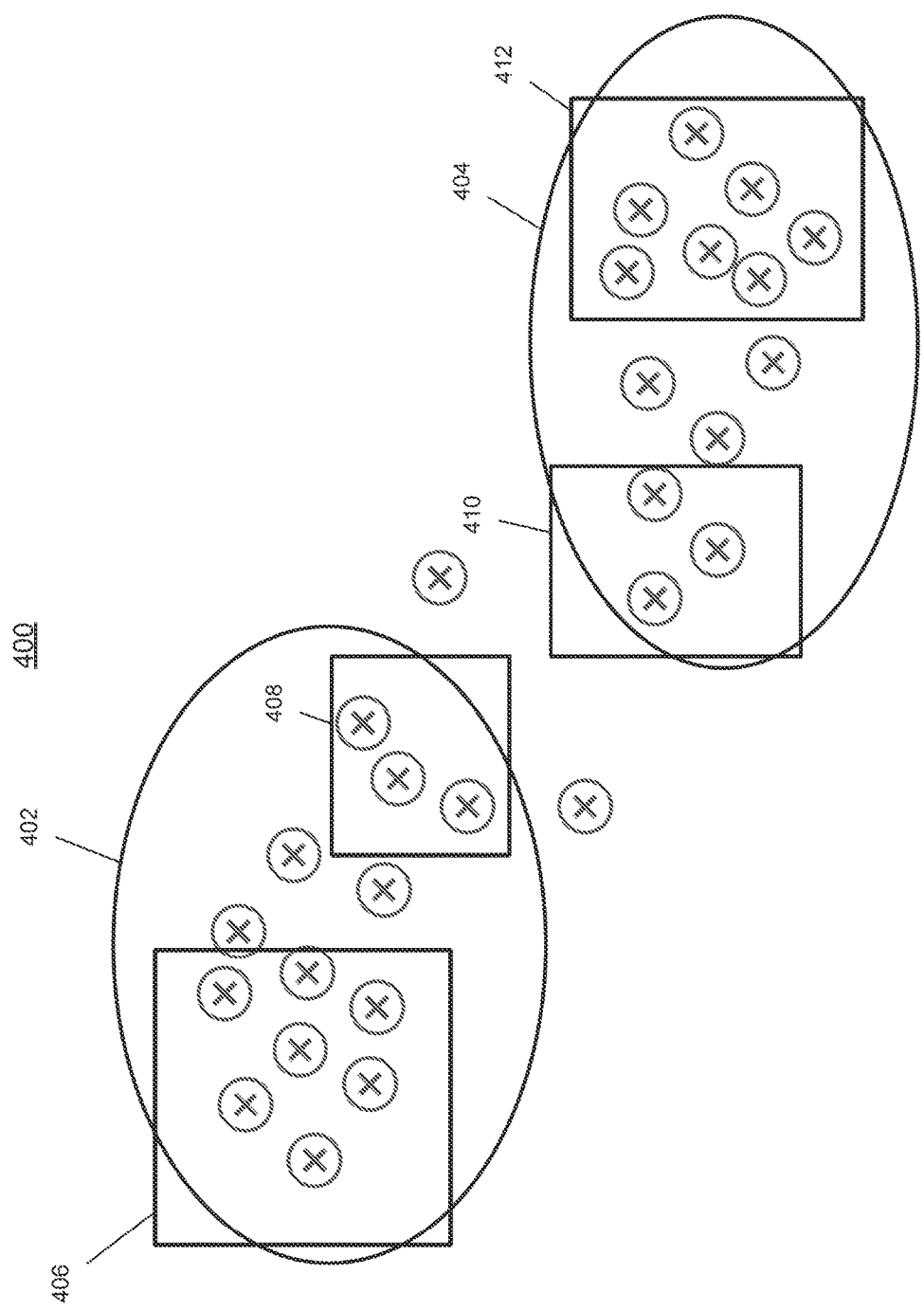
FIG. 4 depicts an illustration of an example learned distribution associated with a learned embedding space according to example embodiments of the present disclosure.

FIG. 4 depicts an illustration of an example learned distribution associated with a learned embedding space according to example embodiments of the present disclosure. In particular, each "x" inside a circle may represent a different speaker embedding in the embedding space. The neural-network-based text-to-speech model can be trained to learn a prior distribution associated with the embeddings in the embedding space 400 in order to better understand the speaker characteristics of different regions of the embedding space 400. For example, the embeddings in the first oval 402 may share the characteristic that the speakers associated with each of these embeddings were labeled as male in the training dataset. Additionally, the embeddings in the second oval 404 may share the characteristic that the speakers associated with each of these embeddings were labeled as female in the training dataset.

Other speaker characteristics may also be learned. For example, the embeddings in the first rectangle 406 and the third rectangle 410 may be associated with speakers from the Midwest of the United States, while the embeddings in the second rectangle 408 and the fourth rectangle 412 may be associated with speakers from the Southeast of the United States. Similar groupings/relationships may be learned for other characteristics, such as a primary language of the speaker, voice pitch of the speaker, and/or age of the speaker.

The "x"s outside of the oval regions and/or outside of the rectangle regions may be speaker embeddings (e.g., d-vector embeddings) that include outlier data that does not meet the learned distribution relationship but may have one or more of the specified characteristics. Therefore, despite the speaker embedding potentially having a desired characteristic, the embedding neighbors of these speaker embeddings may not be sampled as the embeddings may lead to the generation of uncharacteristic data and/or a noisy output.

Alternatively and/or additionally, the system may select a speaker embedding outside of a learned distribution region in order to provide a speaker that is not directly and/or overtly associated with a specific learned characteristic. For example, a user may input that they want a speaker that does not fall within the learned male distribution or the learned female distribution. As a result, the system may determine a speaker embedding can be sampled from the embedding space that does not fall within either the male distribution or the female distribution.

Figure 5:
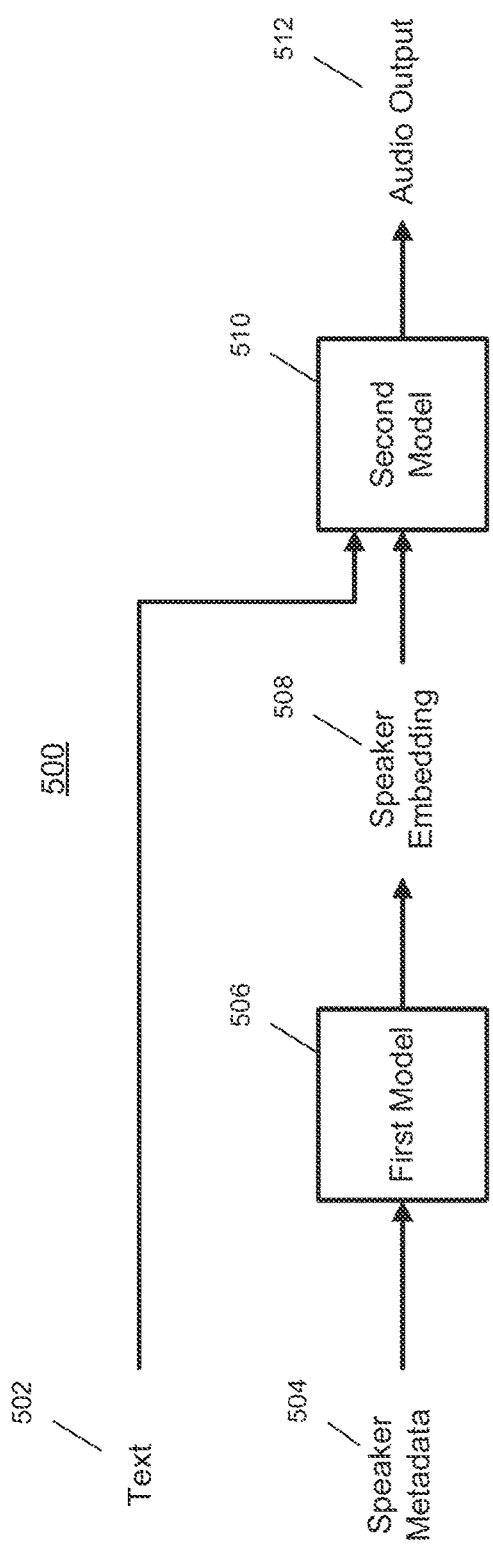
FIG. 5 depicts a block diagram of an example neural-network-based text-to-speech model according to example embodiments of the present disclosure.

FIG. 5 depicts a block diagram of an example neural-network-based text-to-speech model according to example embodiments of the present disclosure. In particular, FIG. 5 depicts a block diagram of an example neural-network-based text-to-speech model 500 according to example embodiments of the present disclosure. The neural-network-based text-to-speech model 500 is similar to the neural-network-based text-to-speech model 200 of FIG. 2 except that the neural-network-based text-to-speech model 500 of FIG. 5 is explicitly depicted as being configured to receive and process speaker metadata 504.

As depicted in FIG. 5, the neural-network-based text-to-speech model 500 can include a first model 506 (e.g., an embedding model) and a second model 508 (e.g., a generation model). The first model 506 can be configured to process the speaker metadata 504 (e.g., the selected and/or requested desired speaker characteristics) to determine a speaker embedding 508. The speaker embedding 508 and the text data 502 can be processed by the second model 510 to generate audio output data 512. The audio output data 512 can include the text of the text data 502 spoken with a novel voice with the speaker characteristics indicated by the speaker metadata 504.

Example Methods

Figure 6:
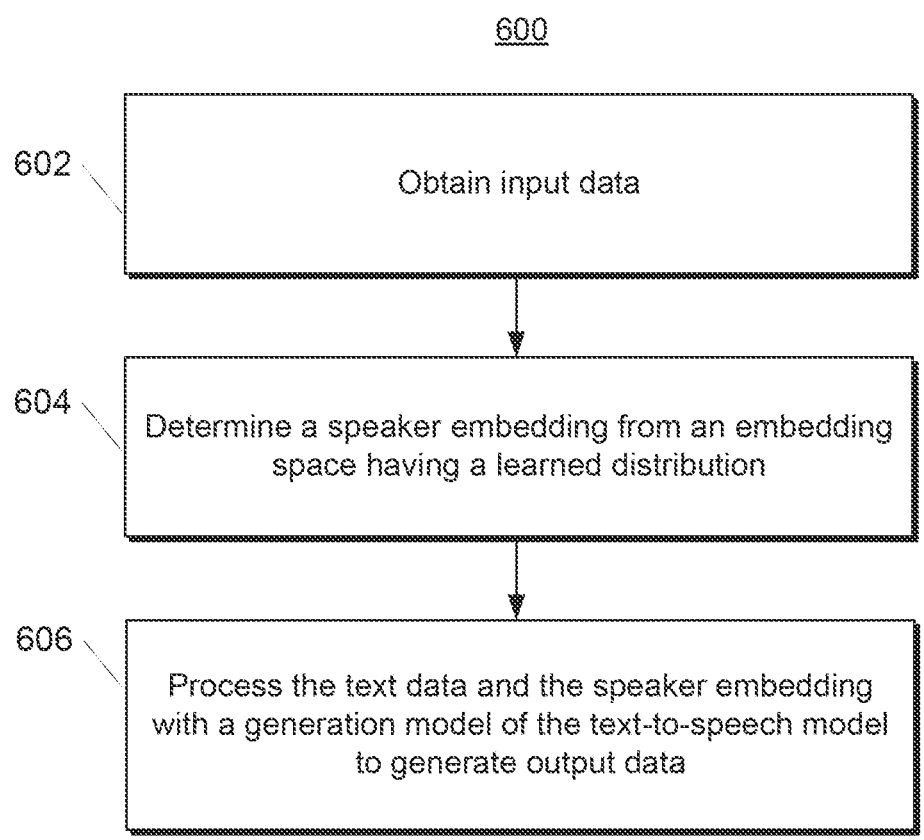
FIG. 6 depicts a flow chart diagram of an example method to perform novel speaker generation according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain input data. The input data can include text data associated with a phoneme sequence. The phoneme sequence can be descriptive of one or more words. Additionally and/or alternatively, the input data can include one or more desired speaker characteristics. The input data may be obtained from a user computing device.

At 604, the computing system can determine a speaker embedding from an embedding space having a learned distribution. The speaker embedding can be representative of a desired speaker. In some implementations, a learned distribution of an embedding space can be sampled to determine the speaker embedding. In some implementations, the speaker embedding can differ from each of a plurality of training embeddings. The plurality of training embeddings can be associated with a plurality of training datasets used for training a text-to-speech model. In some implementations, the speaker embeddings and/or the training embeddings may include vector embeddings (e.g., d-vector embeddings).

At 606, the computing system can process the text data and the speaker embedding with a generation model of the text-to-speech model to generate output data. In some implementations, the output data can include audio data descriptive of the phoneme sequence spoken by the desired speaker. Additionally and/or alternatively, the desired speaker can have a particular speaker characteristic desired by a user.

Figure 7:
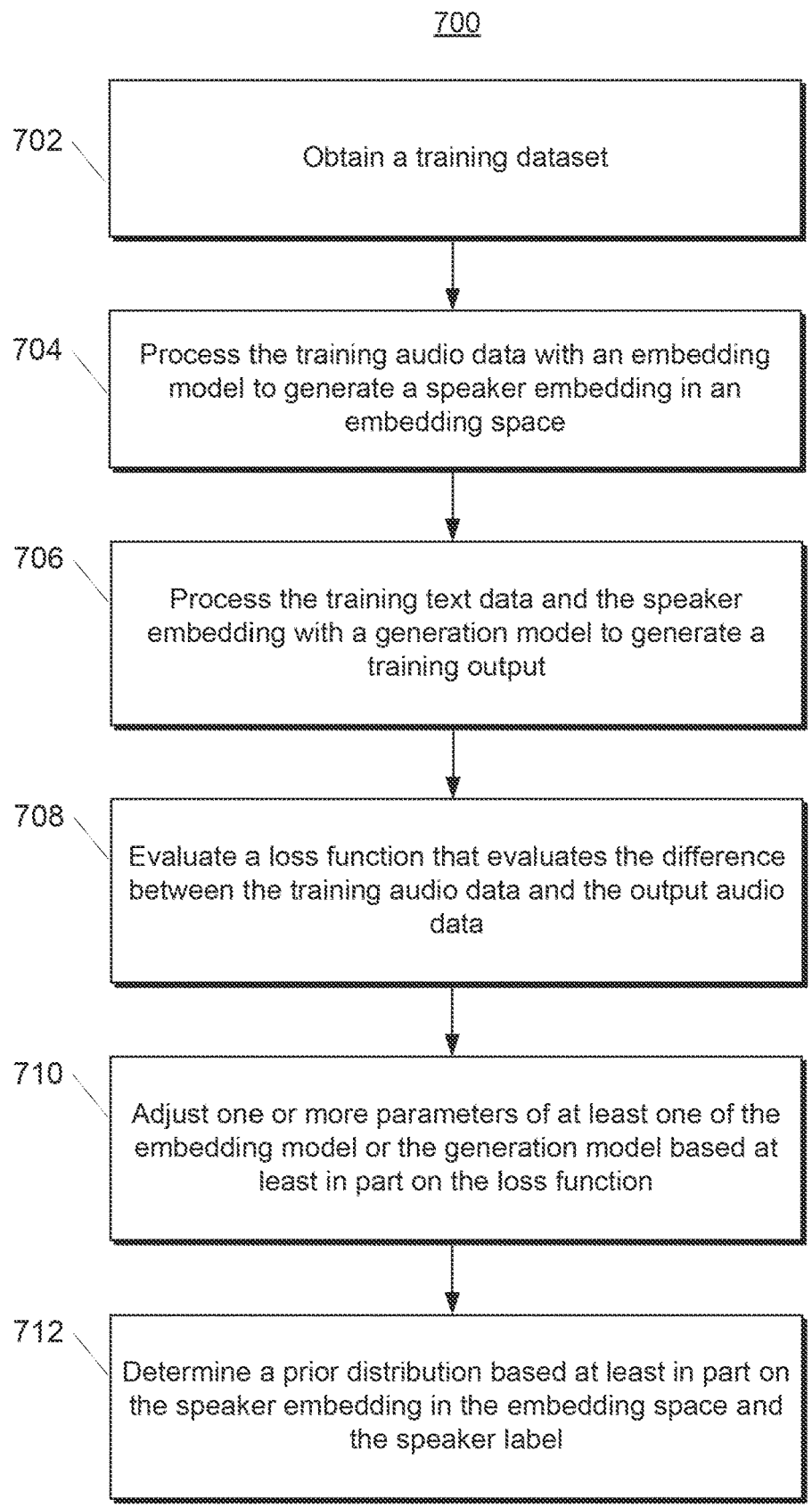
FIG. 7 depicts a flow chart diagram of an example method to perform text-to-speech model training according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a training dataset. The training dataset can include training text data, training audio data associated with the training text data, and a speaker label associated with the training audio data. In some implementations, the training dataset can include a target mel spectrogram, a training utterance, an utterance-level conditioning input, speaker metadata, and mapping data. Additionally and/or alternatively, the training text data can include an utterance-level conditioning input, and the utterance-level conditioning input may include data descriptive of a phoneme sequence. In some implementations, the training text data can include an utterance-level conditioning input, and the utterance-level conditioning input may include auxiliary data comprising stress markings.

Additionally and/or alternatively, the speaker label can include speaker metadata, and the speaker metadata may include a language associated with the training audio data. In some implementations, the speaker label can include speaker metadata, and the speaker metadata may include a gender of a speaker associated with the training audio data.

At 704, the computing system can process the training audio data with an embedding model to generate a speaker embedding in an embedding space. The speaker embedding can include one or more latent feature vectors. In some implementations, the speaker embedding may be annotated with the speaker label.

At 706, the computing system can process the training text data and the speaker embedding with a generation model to generate a training output. The training output can include output audio data. In some implementations, the training output can include mel spectrogram data that can be compared to training mel spectrogram data to determine a gradient descent to backpropagate to the machine-learned models.

At 708, the computing system can evaluate a loss function that evaluates the difference between the training audio data and the output audio data. In some implementations, the loss function can include a deterministic loss associated with a fixed-variance isotropic Laplace output distribution.

At 710, the computing system can adjust one or more parameters of at least one of the embedding model or the generation model based at least in part on the loss function. In some implementations, adjusting the one or more parameters can be based at least in part on optimization of a log likelihood associated with a speaker embedding prior.

At 712, the computing system can determine a prior distribution based at least in part on the speaker embedding in the embedding space and the speaker label. In some implementations, the speaker label may include one or more speaker characteristics associated with a speaker. The prior distribution can include data descriptive of a relationship between one or more known embeddings in the embedding space. The relationship can be based on a shared speaker characteristic (e.g., gender of speaker, geographic region of speaker, primary language of speaker, age of speaker, voice pitch of speaker, etc.). In some implementations, the relationship may be determined based on a plurality of training speaker labels. Alternatively and/or additionally, the relationship may be determined based on a proximate location shared between the embeddings in the embedding space.

Figure 8:
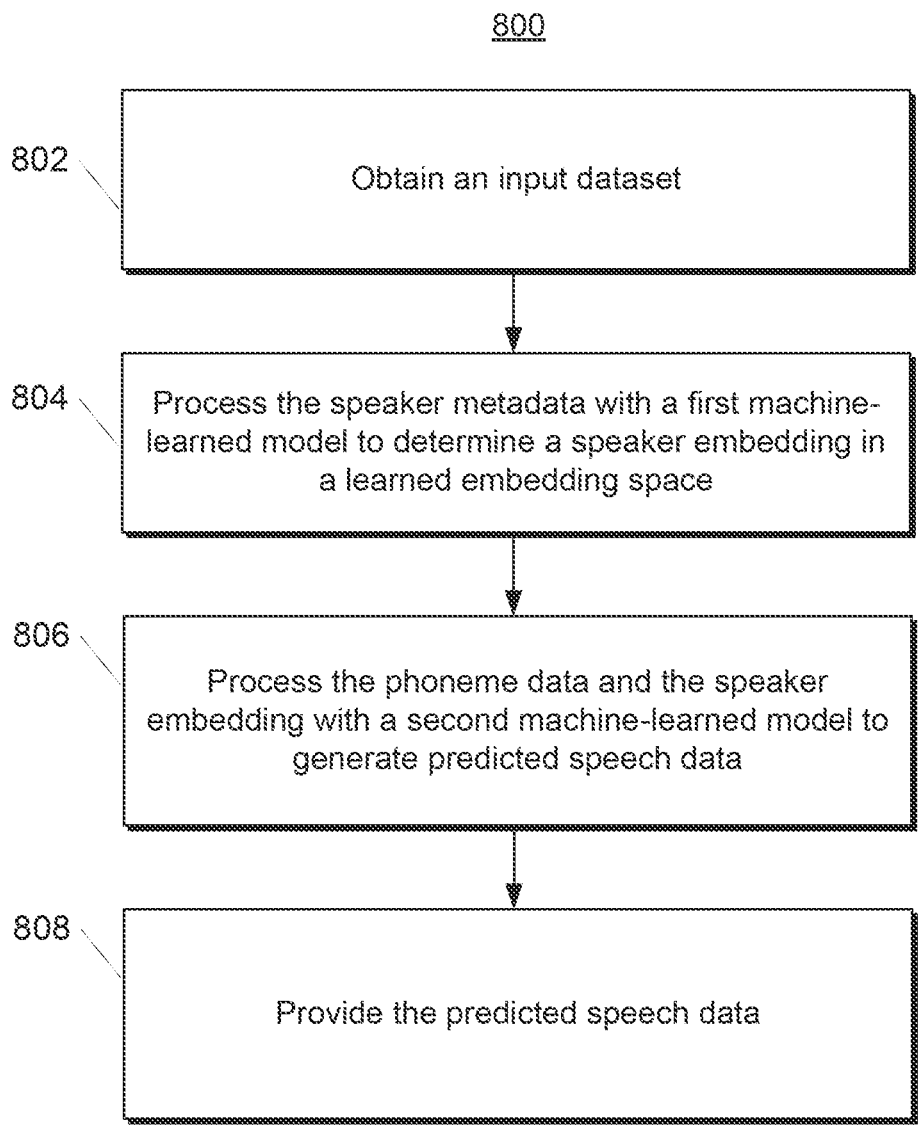
FIG. 8 depicts a flow chart diagram of an example method to perform novel speaker generation according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain an input dataset. In some implementations, the input dataset can include phoneme data and speaker metadata. The phoneme data can be descriptive of a phoneme sequence associated with one or more words. Additionally and/or alternatively, the speaker metadata can be descriptive of one or more desired speaker characteristics. In particular, the speaker metadata can include user-selected data associated with a desired speaker. For example, the user may input a text string that they want to be read by a speaker with one or more specific characteristics. The speaker characteristics may include gender of the speaker, region of speaker, primary language of the speaker, age of the speaker, voice pitch of the speaker, etc. Additionally and/or alternatively, the speaker metadata can include language data, region data, and gender data.

At 804, the computing system can process the speaker metadata with a first machine-learned model to determine a speaker embedding in a learned embedding space. The speaker embedding can be associated with a region of the embedding space that has been notated as being associated with the desired speaker characteristic. Additionally and/or alternatively, the speaker embedding may differ from the one or more embeddings generated during the training of the machine-learned model based on a training dataset. In some implementations, the first machine-learned model can include an embedding model of a neural-network-based text-to-speech model.

At 806, the computing system can process the phoneme data and the speaker embedding with a second machine-learned model to generate predicted speech data. The second machine-learned model can include a generation model of a neural-network-based text-to-speech model.

At 808, the computing system can provide the predicted speech data. The predicted speech data can include data descriptive of one or more sound waves. Additionally and/or alternatively, the predicted speech data can differ from a plurality of training speech examples associated with a plurality of training datasets used to train the first machine-learned model and the second machine-learned model.

Example Implementations

The systems and methods disclosed herein can be leveraged to generate and train a TacoSpawn model, a two-level MLE method for learning a distribution over a speaker embedding space that is efficiently co-trained with an existing TTS model. The systems and methods can utilize a set of objective metrics to measure how well speaker distributions match their desired targets. The resulting models can produce novel speakers with the same diversity and similar quality as the real speakers in our training sets.

The systems and methods disclosed herein can train a machine-learned model for the task of synthesizing speech in human-sounding voices unseen in any training set. The speaker generation task can be performed by a speaker generation model (e.g., a TacoSpawn model). In some implementations, the speaker generation model can include a deep neural-network-based text-to-speech model that learns a distribution over a speaker embedding space, which can enable sampling of novel and diverse speakers. Additionally, in some implementations, the systems and methods may not utilize transfer learning from speaker ID systems.

Neural-network-based text-to-speech (TTS) models based on deep neural networks can generate high fidelity audio that may be hard for humans to distinguish from genuine speech. A major limitation of existing models can be that they can only synthesize the voices of the human speakers used in the training data set. Adding new voices to these models can be time consuming and laborious, requiring recording sessions in a studio-quality environment with human voice actors before a model can be retrained or fine-tuned. The ability to easily generate speech in a rich variety of novel character voices can have practical importance for a variety of applications including audiobook readers, speech-based assistants, and speech for games and videos. Moreover, designing a TTS model that enables adding new expressive voices to these products with little effort can be transformative. Additionally, the systems and methods can present a privacy preserving alternative to voice cloning systems, which aim to recreate a human speaker's voice with only a small amount of ground-truth audio.

One example implementation of the systems and methods disclosed herein may utilize a TacoSpawn model, a TTS model that can be designed to directly generate high-quality speech from novel speakers. The TacoSpawn model can include a two-level maximum likelihood estimation model in order to learn a distribution over speaker embeddings.

An example implementation may utilize a model based on a Tacotron model. Tacotron can include a speech synthesis model that predicts mel spectrogram outputs from character or phoneme input sequences. Additionally and/or alternatively, the systems and methods may include adding trainable speaker embeddings to support multiple speakers, and the system may use a neural vocoder to convert mel spectrogram outputs to the time domain.

The training corpus (Y, X, C, J) can include target mel spectrograms $Y=[y_i]_{i=1}^I$ for each of I training utterances, utterance-level conditioning input $X=[x_i]_{i=1}^I$ specifying the phoneme sequence and auxiliary data such as stress markings, speaker metadata $C=[c_j]_{j=1}^J$ specifying the language, region and gender of each of J training speakers, and a mapping $J: \{1, \ldots, I\} \rightarrow \{1, \ldots, J\}$ specifying the training speaker for each utterance. The systems and methods can learn a speaker embedding table $S=[s_j]_{j=1}^J$ and other model parameters to maximize the log likelihood $$\log p_\theta(Y|X,S,C,j) = \Sigma_i \log p_\theta(y_i|x_i, s_{j(i)}, c_{j(i)}) \qquad (1)$$

under a Tacotron model $p_\theta(y|x, s, c)$ which can autoregressively predict a mel spectrogram sequence $y=[y_t]_{t=1}^T$ given a phoneme sequence x, a speaker embedding $s \in \mathbb{R}^D$ and speaker metadata c. The domain can be $D \in \{64, 128, 256\}$. In some implementations, the systems and methods can use the original deterministic Tacotron $\ell$ loss when teacher forcing during training, corresponding to a fixed variance isotropic Laplace output distribution in the probabilistic formulation presented here. We synthesize speech by sampling a mel spectrogram $y \sim p_\theta(y|x,s,c)$ with temperature zero, meaning $$y_t = \arg\max_{y_t} p(y_t \mid y_{1:t-1}, x, s, c).$$

For speaker generation, the system can perform a second level of maximum likelihood estimation, treating (S, C) as a training corpus with the J learned speaker embeddings $S=[s_j]_{j=1}^J$ as targets. The system can learn parameters $\omega$ to maximize the log likelihood $$\log p_\omega(S|C) = \Sigma_j \log p_\omega(s_j|c_j) \qquad (2)$$

under a speaker embedding prior $p_\omega(s|c)$. The two-level maximum likelihood estimation approach can be referred to as TacoSpawn. To generate a new speaker, the systems and methods can sample an embedding from the prior, conditional on the desired speaker's language, region and gender metadata. For a well-trained system, such samples can represent speakers which are not in the training set, but which plausibly could be in a larger training set.

The systems and methods can consider two parametric families for the prior $p_\omega(s|c)$: mixture of Gaussians and mixture of power spherical distributions. In the power spherical case, the system can restrict each speaker embedding $s_j$ to lie on the unit sphere in $\mathbb{R}^D$. In some implementations, the systems and methods can allow $p_\omega(s|c)$ to depend on any subset of language, region and gender, including the empty set (an unconditional prior $p_\omega(s|c) = p_\omega(s)$). The simple distributions can be utilized as a match for the distribution of the learned training speaker embeddings and can be effective for high-quality speaker generation.

In some implementations, the systems and methods can train $\theta$ and $\omega$ at the same time, using a stop-gradient operation on S when optimizing $\log p_\omega(S|C)$ to prevent the learning of S being affected by the prior. The final training objective may be $$L^{TacoSpawn}(\theta, \omega) = \frac{1}{I}\sum_i \log p_\theta(y_i \mid x_i, s_{j(i)}, c_{j(i)}) \qquad (3)$$

$$+ \frac{1}{J}\sum_j \log p_\omega(sg(s_j) \mid c_j) \qquad (4)$$

where sg is the stop-gradient operation and where the first term is replaced by a minibatch approximation in practice. In some implementations, fewer training steps may be utilized to estimate $\omega$ than to estimate $\theta$; however, no overfitting of $\omega$ may occur when using a larger number of training steps appropriate for learning $\theta$.

Alternatively and/or additionally, instead of learning the speaker embedding table S using maximum likelihood estimation, the systems and methods may instead infer it in a Bayesian way, treating each speaker's embedding as a global latent variable with some posterior distribution to be inferred. The system may specifically consider a variational Bayesian approach with amortized inference, and may refer to this formulation as TacoSpawn-VB. A Bayesian approach can have a number of potential advantages: the approach can naturally integrate learning the Tacotron model parameters $\theta$ and the prior parameters $\omega$ in a coherent way; the approach may prevent overfitting of the speaker embedding for speakers with few utterances; and the approach may naturally encourage the learned embeddings to be easily modelable under the parametric prior, in contrast to the maximum likelihood approach where the prior has no effect on the learned embeddings.

The TacoSpawn-VB speaker model objective can a bound on the log marginal likelihood:

$$\log p_{(\theta,\omega)}(Y \mid X, C, \bar{J}) \quad (5)$$

$$= \log \int p_\theta(Y \mid X, S, C, \bar{J}) p_\omega(S \mid C) dS \quad (6)$$

$$= \log \int \frac{p_\theta(Y \mid X, S, C, \bar{J}) p_\omega(S \mid C)}{q_v(S)} q_v(S) dS \quad (7)$$

$$\geq \int q_v(S) [\log p_\theta(Y \mid X, S, C, \bar{J}) + \log p_\omega(S \mid C) \log q_v(S)] \quad (8)$$

$$= \sum_i \int q_{v_{\bar{j}(i)}}(s) \log p_\theta(y_i \mid x_i, s, c_{\bar{j}(i)}) ds \quad (9)$$

$$+ \sum_j \int q_{v_j}(s) [\log p_\omega(s \mid c_j) - \log q_{v_j}(s)] ds \quad (10)$$

where the variational posterior $q_v(S)$ can also be learned and can be assumed factored $q_v(S) = \Pi_j \, jq_{v_i}(s_j)$ without loss of generality, where $v_j$ can be the parameters of the distribution for speaker j. Conditioning $q_{v_j}$ on $c_j$ may be unnecessary since $v_j$ is specific to speaker j and the metadata $c_j$ never changes. In some implementations, the systems and methods can use a diagonal Gaussian or power spherical distribution for the variational posterior.

The systems and methods may utilize an additional parameter β controlling the "capacity" of the speaker representation encoded in $q_v$. In some implementations, the final training objective can be $$L^{TS-VB}(\theta, \omega, v) =$$
$$\frac{1}{I} \sum_i q_v(s_{\bar{j}(i)}) \log p_\theta + \beta \frac{1}{J} \sum_j q_v(s_j) [\log p_\omega(s_j \mid c_j) - \log q_{v_j}(s_j)]$$

where the first term can be replaced by a minibatch approximation in practice. For a strict Bayesian formulation β=J/I, the system may denote to the term which β multiplies as the KL term. In some implementations, the final objective can include one term which can be an average over utterances, and one term which can be an average over speakers. In some implementations, the proper mathematical formulation can be that the second term above is an average over all speakers in the training set rather than the speakers in the current minibatch.

In the limit β→0, the Bayesian approach can reduce to the two-level MLE approach described above. Ignoring irrelevant additive constants, the objective for learning θ and v can become $\int q_v(S) \log p_\theta(Y, X, C, \bar{J}) dS$. The optimal $q_v(S)$ can have all mass on $$\arg \max_S p_\theta(S \mid Y, X, C, \bar{J}).$$

Ignoring irrelevant terms, the objective for learning the prior can be $\beta \int q_v(S) \log p_j(S \mid C) dS$. The resulting equation trends to zero as β=0, but if the system can use an optimizer which is approximately invariant to scale, or if the system can use stochastic gradient descent and scale the learning rate on ω by 1/β, then the system can effectively drop the β multiplier, and the objective can become log $p_\omega(S \mid C)$, where S can be the deterministic value of $q_v$. The system can therefore leverage the two-level maximum likelihood approach as the high-capacity limit of the more principled variational approach.

To evaluate speaker modeling and speaker generation performance objectively, the systems and methods can examine the statistical properties of distances between speakers, measured in an audio-based speaker representation space. This can yield intuitive objective measures of quantities such as the fidelity with which the model captures training speakers, and the diversity of generated speakers.

The four different speaker realizations can be defined and/or calculated as:

target: The ground truth waveforms $W_i^T = [w_i^T]_{i=1}^I$ for the training speakers.

synth: The synthesized waveforms $W_i^S = [w_i^S]_{i=1}^J$ for the training speakers, where $$s_j \sim q_{v_j}(s); j=1; \ldots ;J \quad (11)$$

$$y_i \sim p_\theta(y \mid x_i; s_{\bar{j}}(i); c_{\bar{j}}(i)); \; i=1; \ldots ;I \quad (12)$$

$$w_i = \text{vocode}(y_i); i=1; \ldots ;I \quad (13)$$

and $y_i$ can be sampled with temperature zero. For two-level MLE models, $s_j$ can be set to the learned speaker embedding.

gen: The synthesized waveforms $W_i^g = [w_i^G]_{i=1}^I$ for the generated speakers. The system can synthesize these by first sampling $$s_j \sim p_\omega(s \mid c_j); j=1; \ldots ;J \quad (14)$$

and then generating $y_i$ and $w_i$ as above. To ensure the computed distance statistics are directly comparable, the system can use one generated speaker per training speaker, and one synthesized utterance per training corpus utterance.

In some implementations, the systems and methods can convert these realizations to speaker representation space using a d-vector model $\bar{v}$, which can take a speech waveform w as input and returns a vector $\bar{v}(w) \in \mathbb{R}^{256}$. The d-vector model can be trained on a separate corpus and can be intended to be speaker-discriminative. The system can then compute speaker-level d-vectors by averaging utterance-level d-vectors, i.e., $$v_j^A = \frac{1}{\#\{i: \bar{j}^-(i) = 1\}} \sum_{i: \bar{j}(i)=1} \bar{v}(w_i^A) \quad (15)$$

where $A \in \{T, S, G\}$.

The cosine distance can be defined as the distance between two d-vectors in terms of their normalized dot product:

$$d(v_1; v_2) = 1 - \frac{v_1}{\|v_1\|} \cdot \frac{v_2}{\|v_2\|}.$$

The system can use d-vectors instead of the learned speaker embedding since the d-vectors depend on audio and can allow separate training runs to be meaningfully compared. d-vectors can be known to capture speaker identity characteristics. From the averaged speaker d-vectors, the system can compute speaker distance statistics.

The first metrics can measure the fidelity with which the model captures the training speakers:

s2t-same: How close is the synth realization of a typical training speaker to their target realization?

$$\underset{j}{\text{median}}\, d(v_j^S, v_j^T) \quad (16)$$

s2t: How close is the synth realization of a typical training speaker to other nearby training speaker target realizations?

$$\underset{j}{\text{median}}\, \underset{k \neq j}{\min}\, d(v_j^S, v_j^T) \quad (17)$$

A small s2t-same value can indicate that synthesized speech from a training speaker sounds like that speaker. A good speech synthesis system (with a speaker generation model or otherwise) may yield s2t-same values smaller than s2t.

The next three metrics can be relevant for evaluating speaker generation performance:

s2s: How close is a typical training speaker to other nearby training speakers, when both are synthesized?

$$\underset{j}{\text{median}}\, \underset{k \neq j}{\min}\, d(v_j^S, v_k^S) \quad (18)$$

g2s: How close is a typical generated speaker to nearby training speakers, where both are synthesized? (The systems and methods may exclude k=j for uniformity).

$$\underset{j}{\text{median}}\, \underset{k \neq j}{\min}\, d(v_j^G, v_k^S) \quad (19)$$

g2g: How close is a typical generated speaker to other nearby generated speakers?

$$\underset{j}{\text{median}}\, \underset{k \neq j}{\min}\, d(v_j^G, v_k^G) \quad (20)$$

In some implementations, the systems and methods can define an "ideal" speaker generation system as one in which the distribution of generated speakers matches the distribution of training speakers in any given speaker representation space. Quantitative measures toward the ideal can include: s2s provides a baseline against which to compare g2s and g2g. Additionally and/or alternatively, the quantitative measures toward the ideal can include: g2s provides a measure of how natural or realistic a typical generated speaker sounds: g2s larger than s2s indicates that audio from a typical generated speaker is further than it should be in speaker representation space from the manifold of synthesized audio from training speakers. g2s in relation to s2s can also ensure that speakers are, in fact, novel. A system that "generated" speakers similar to those from the training set may have a g2s much smaller than s2s. In some implementations, the quantitative measures toward the ideal can include: g2g provides a measure of the diversity of generated speakers. g2g smaller than s2s can indicate that generated speakers are clumped together in speaker representation space more than the synthesized training speakers are. For example, if all generated speakers individually sounded like a plausible new speaker, but basically all sounded the same, then g2s may be close to s2s but g2g may be very small. The quantitative measures toward the ideal can further include: a good s2t-same value. For example, if the synth audio does not capture speaker identity well then neither will the generated audio, even if s2s, g2s and g2g metrics are all equal, but this weakness may show up in s2t-same.

In some implementations, for an ideal speaker generation system, the system may produce g2s and g2g that are equal to s2s, and s2t-same can be less than s2t.

Example Experiments

The models can be trained on input phoneme sequences produced by a text normalization front-end and lexicon. In some implementations, the focus can be speaker representation rather than the model's ability to learn pronunciations from graphemes. The models can be optimized using ~300 k steps on 32 Google TPUv3 cores, using batch size 256.

Results can be shown using both public and proprietary multispeaker English datasets, all sampled at 24 kHz. The datasets can include: libriclean (public): All "clean" subsets of the LibriTTS corpus, combined into one (US English, 1230 speakers, 240.5 hours, mixed-gender); enus1100 (proprietary): A 1100-speaker US English dataset of mixed-gender voices speaking for 30 minutes each, for a total of ~246,000 utterances (~500 hours); and enxx (proprietary): A 1468-speaker dataset that adds to the dataset above 368 audiobook, voice assistant, and news-reading English speakers.

In some implementations, the models can be trained on the enus1100 dataset and may use Griffin-Lim vocoding to allow fast iteration.

The systems and methods can test the variational Bayesian approach using 128-dimensional embeddings and a learned unconditional mixture of 10 Gaussians prior. The system can target a particular value of the KL term, automatically learning the corresponding value of $\beta$. Table 1 can show objective results for these experiments. As depicted, TacoSpawn-VB can perform similarly to TacoSpawn for small (large KL term). However as is increased, both speaker modeling (s2t-same) and generation performance (e.g., g2g) can degrade. This can lead to favoring the simpler TacoSpawn approach.

| Approach | KL | s2t-same | s2t | s2s | g2s | g2g |
|---|---|---|---|---|---|---|
| TacoSpawn |  | 0.24 | 0.35 | 0.2 | 0.2 | 0.2 |
| TS-VB | 898 | 0.23 | 0.35 | 0.19 | 0.2 | 0.19 |
| TS-VB | 400 | 0.24 | 0.34 | 0.19 | 0.19 | 0.19 |
| TS-VB | 200 | 0.23 | 0.34 | 0.19 | 0.18 | 0.17 |
| TS-VB | 100 | 0.25 | 0.33 | 0.18 | 0.16 | 0.16 |

Table 1 can depict an evaluation of the variational Bayes (TS-VB) approach. A KL term value of 898 can correspond to $\beta=10^{-5}$.

Due to the success of d-vectors for voice cloning, using d-vectors as speaker embeddings can be investigated. In this experiment, the model can learn an unconditional mixture of 10 Gaussians prior over the set of speaker d-vectors, where each speaker's d-vector may be computed by averaging the d-vectors computed on their training set utterances. Objective results can be shown in Table 2. As shown, the d-vectors can capture the training speakers reasonably well (s2t-same), though still not as well as learned vectors (TacoSpawn) of the same dimension. However, d-vectors can appear to be much less amenable to modeling with a simple parametric prior (g2s and g2g much too large). The system can therefore use learned vector embeddings.

| Approach | dim | s2t-same | s2t | s2s | g2s | g2g |
|---|---|---|---|---|---|---|
| TacoSpawn | 64 | 0.25 | 0.34 | 0.22 | 0.23 | 0.22 |
| TacoSpawn | 256 | 0.21 | 0.33 | 0.24 | 0.26 | 0.21 |
| d-vector | 256 | 0.23 | 0.34 | 0.23 | 0.36 | 0.29 |

Table 2 can depict preliminary experiment results that can investigate d-vectors as a speaker embedding. An ideal speaker generation system may have a small s2t-same with g2s and g2g equal to s2s.

Experimental results can be shown for an example proposed two-level MLE TacoSpawn model. The TacoSpawn model can be trained on the enxx datasets and can use an adversarially-trained non-causal WaveNet.

The GAN vocoder generator can be trained to minimize the reverse KL divergence to the reference waveform in a hybrid f-GAN training setup. The critics can be trained using Jensen-Shannon divergence with an L1 feature matching loss applied at every hidden layer.

To evaluate how well the distribution of generated speakers matches that of speakers in the training set, the system can compute the speaker distance metrics. Table 3 can show both English-only and multilingual models, using either a mixture of power sphericals (MoPS) or mixture of Gaussians (MoG) as the learned prior. Experimental results can show that s2t-same is lower than s2t, providing a useful sanity check that the model successfully captures characteristics of speaker identity for the training speakers. In some implementations, the experimental results can show that speaker generation performance is near-perfect according to the proposed metrics, with g2s and g2g almost perfectly matching s2s, indicating that the distance statistics of the generated speakers are both as natural and as diverse as those of the training speakers.

| Dataset | prior | s2t-same | s2t | s2s | g2s | g2g | t2t |
|---|---|---|---|---|---|---|---|
| libriclean | MoPS | 0.4 | 0.51 | 0.42 | 0.42 | 0.42 | 0.5 |
| enxx | MoPS | 0.27 | 0.33 | 0.17 | 0.17 | 0.16 | 0.31 |
| enxx | MoG | 0.27 | 0.33 | 0.17 | 0.17 | 0.17 | 0.31 |

Table 3 can depict speaker distance metrics results for TacoSpawn models, using either a mixture of power sphericals or mixture of Gaussians as the learned prior.

As depicted, the s2t-same can be larger than s2s for all models. This can be undesirable (in a perfect synthesis system with perfect speaker representations, s2t-same would be near zero), but may be consistent with the finding that d-vectors from synthesized speakers can be more similar than d-vectors from one synthesized and one real human speaker.

Plotting speaker d-vectors can help visualize these speaker distance relationships. FIG. 4 may show t-SNE plots of both synth and gen speaker d-vectors from our LibriTTS model. The d-vectors can fall into two gender clusters, showing that the closest voice is almost always from the same gender. FIG. 4 can show that the synth and gen d-vector distributions may be nicely overlapping, and that the distance from an arbitrary speaker to its closest neighbor is just as likely to be a gen as synth speaker.

To further examine the perceptual properties captured by speaker distance metrics, the system can be compared by analyzing the pitch ranges of synth and gen speakers. The Yin extraction algorithm can be used for evaluation with a frame shift of 12.5 ms to compute median F0 of utterances spoken by 200 generated and 200 training speakers (100 of each gender). The results can show that the $F_0$ range of synth and gen speakers are equally diverse, clearly cluster into male and female, and are distributionally similar.

Example Architectures

An example sequence-to-sequence model can include a mel-spectrogram prediction network utilizing a Tacotron model with some modifications. Input to the model can include sequences of phonemes produced by a text normalization pipeline rather than character inputs. A CBHG text encoder can be utilized to convert the input phonemes into a sequence of text embeddings. The phoneme inputs can be converted to learned 256-dimensional embeddings and can be passed through a pre-net composed of two fully connected ReLU layers (with 256 and 128 units, respectively), with dropout of 0.5 applied to the output of each layer, before being fed to the encoder. The learned 128-dimensional speaker embedding can be broadcast-concatenated to the output of the text encoder.

The attention block can use a single LSTM layer with 256 units and zoneout of 0.1 followed by an MLP with 128 tanh hidden units to compute parameters for the monotonic 5-component GMM attention window. The system may use a GMMv2b attention mechanism. Instead of using the exponential function to compute the shift and scale parameters of the GMM components, GMMv2vb can use the softplus function, and can also add initial bias to these parameters, which can lead to faster alignment and more stable optimization. The attention weights predicted by the attention network can then be used to compute a weighted sum of output of the text encoder, producing a context vector. The context vector can be concatenated with the output of the attention LSTM layer before being passed to the first decoder LSTM layer. The autoregressive decoder module can include 2 LSTM layers each with 256 units, zoneout of 0.1, and residual connections between the layers. The 128-bin mel-spectrogram output can be produced using a linear layer on top of the 2 LSTM layers, and the system can use a reduction factor of 2, which can cause the system to predict two spectrogram frames for each decoder step. The decoder can then be fed the last frame of its most recent prediction (or the previous ground truth frame during training) and the current context as computed by the attention module. Before being fed to the decoder, the previous prediction may be passed through a pre-net with the same structure used before the text encoder above its own parameters. A full set of example Tacotron parameters are listed in Table 4.

| Module | Hyperparameters |
|---|---|
| Input | Text-normalized phonemes |
| Phoneme embedding | 256-D |
| Pre-net | FC-256-Relu-Dropout(0.5) |
| | FC-128-Relu-Dropout(0.5) |
| CBHG text encoder | Conv1D bank: K = 16, conv-k-128-Relu |
| | Max pooling with stride = 1 |
| | width = 2 |
| | Conv1D projections: |
| | conv-3-128-Relu |
| | conv-3-128-Linear |
| | Highway net: 4 layers of FC-128 Relu |
| | Bidirectional GRU: 128 cells |

-continued

| Module | Hyperparameters |
|---|---|
| Speaker embedding | 128-D |
| Attention type | 5-component GMM attention w/softplus |
| Attention RNN | LSTM-256-Zoneout(0.1)→FC-128-tanh |
| DecoderRNN | 2-layer residual-LSTM-256-Zoneout(0.1)→FC-128-Linear |
| Mel-spectrogram decoder targets | FFT size: 2048<br>Frame hop: 300<br>Frame length: 1200<br>Mel bands: 128 |
| Reduction factor | 2 |
| Optimizer | ADAM w/learning rate $10^{-3}$, batchsize 256 |

In some implementations, a GAN-based vocoder can be utilized with a non-causal WaveNet generator and both waveform and spectrogram critics. The 128-bin mel-spectrogram input features can match the decoder targets and can be fed to the generator through a 5-layer dilated convolution conditioning stack. The output can be upsampled to the audio frame rate using repetition and can be concatenated with noise before being input to the generator stack. The generator outputs 24 kHz waveform audio.

The vocoder critics can include 1) multi-period waveform critics, configured exactly as in HiFi-GAN, and 2) both linear and mel-spectrogram critics, which can obtain as input spectrogram features extracted from audio. The spectrogram features may match those of the decoder targets (see Table 4), except that the system may use a frame hop of 240 for linear spectrograms.

The generator may be trained to minimize the reverse KL divergence to the reference waveform in a hybrid f-GAN training setup. In some implementations, the critics can be trained using a Jensen-Shannon divergence with an $\ell_1$ feature matching loss applied at every hidden layer.

A full set of example GAN vocoder parameters are listed in Table 5.

| Module | Hyperparameters |
|---|---|
| Conditioning stack | Mel-spectrogram input<br>5 layers DilatedConv1D-512<br>Each layer: kernel size = 3,<br>$2^i$ conv dilation for layer i<br>Repeat-upsampled to match audio frame rate |
| Generator | Non-causal WaveNet<br>3 blocks of 10 DilatedConv1D-128 layers<br>Each layer: kernel size = 3,<br>$2^i$ conv dilation for layer i<br>Activation between layers: gated tanh<br>Output layers: 2 × dense 128 units w/ReLU<br>Final linear projection to dim 1, no activation |
| Multi-period critics | Waveform input<br>Critics with periods (2, 3, 5, 7, 11), |
| Spectrogram critics | Spectrogram input (linear or mel)<br>Conv2D-32, kernel size [3,4], strides = [1,2])<br>Conv2D-32, kernel size [3,4], strides = [1,2])<br>Conv2D-128, kernel size [3,4], strides = [1,2])<br>Flatten( )<br>Conv1D-1, kernel size 1 |

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for novel speaker generation, the computing system comprising:
   one or more processors; and
   one or more non-transitory computer-readable media that collectively store instructions that, when executed by the one or more processors, cause the computing system to perform operations, the operations comprising:
   obtaining input data, wherein the input data comprises text data associated with a phoneme sequence;
   determining a speaker embedding from an embedding space having a learned distribution, wherein the speaker embedding is representative of a desired speaker,
   wherein the speaker embedding differs from each of a plurality of training embeddings,
   wherein the plurality of training embeddings are associated with a plurality of training datasets used for training a text-to-speech model;
   processing the text data and the speaker embedding with a generation model of the text-to-speech model to generate output data, wherein the output data comprises audio data descriptive of the phoneme sequence spoken by the desired speaker.

2. The computing system of claim 1, wherein the input data comprises one or more desired speaker characteristics; and wherein determining the speaker embedding is conditioned based at least in part on a learned characteristic in the learned distribution.

3. The computing system of claim 1, wherein the learned distribution was learned jointly with training of the text-to-speech model.

4. The computing system of claim 1, wherein the learned distribution comprises a plurality of speaker characteristics learned based on a plurality of speaker labels;
   wherein the input data comprises one or more desired speaker characteristics associated with a particular speaker characteristic of the plurality of speaker characteristics;
   wherein determining the speaker embedding comprises sampling from a subset of the embedding space, wherein the subset of the embedding space comprises one or more training embeddings associated with one or more training datasets associated with the particular speaker characteristic; and wherein the output data is descriptive of the particular speaker characteristic.

5. The computing system of claim 4, wherein the particular speaker characteristic comprises at least one of a particular speaker gender, a particular speaker geography, or a particular speaker language.

6. The computing system of claim 4, wherein the plurality of speaker characteristics comprise a gender of a speaker, a geographic region associated with the speaker, and a language spoken by the speaker.

7. The computing system of claim 1, wherein the text-to-speech model comprises a neural-network-based text-to-speech model that has been trained with a training dataset comprising a plurality of speech datasets associated with one or more speech utterances.

8. The computing system of claim 1, wherein the text-to-speech model has been trained with the plurality of training datasets, wherein the plurality of training datasets comprise a plurality of speech datasets associated with a plurality of different speakers.

9. The computing system of claim 1, wherein the operations further comprise:

evaluating a nearest neighbor distance between the output data and one or more known outputs associated with one or more neighbor embeddings in the embedding space, wherein the one or more neighbor embeddings are located in a region of the embedding space that comprises the speaker embedding.

10. A computer-implemented method, the method comprising:

obtaining, by a computing system comprising one or more processors, a training dataset, wherein the training dataset comprises training text data, training audio data associated with the training text data, and a speaker label associated with the training audio data;

processing, by the computing system, the training audio data with an embedding model to generate a speaker embedding in an embedding space;

processing, by the computing system, the training text data and the speaker embedding with a generation model to generate a training output, wherein the training output comprises output audio data;

evaluating, by the computing system, a loss function that evaluates a difference between the training audio data and the output audio data;

adjusting, by the computing system, one or more parameters of at least one of the embedding model or the generation model based at least in part on the loss function; and determining, by the computing system, a prior distribution based at least in part on the speaker embedding in the embedding space and the speaker label, wherein the speaker label comprises one or more speaker characteristics associated with a speaker.

11. The method of claim 10, wherein the training dataset comprises: a target mel spectrogram, a training utterance, an utterance-level conditioning input, speaker metadata, and mapping data.

12. The method of claim 10, wherein the training text data comprises an utterance-level conditioning input, wherein the utterance-level conditioning input comprises data descriptive of a phoneme sequence.

13. The method of claim 10, wherein the training text data comprises an utterance-level conditioning input, wherein the utterance-level conditioning input comprises auxiliary data comprising stress markings.

14. The method of claim 10, wherein the speaker label comprises speaker metadata, wherein the speaker metadata comprises a language associated with the training audio data.

15. The method of claim 10, wherein the speaker label comprises speaker metadata, wherein the speaker metadata comprises a gender of a speaker associated with the training audio data.

16. The method of claim 10, wherein the loss function comprises a deterministic loss associated with a fixed-variance isotropic Laplace output distribution.

17. The method of claim 10, wherein adjusting the one or more parameters is based at least in part on optimization of a log likelihood associated with a speaker embedding prior.

18. One or more non-transitory computer-readable media that collectively store instructions that, when executed by one or more computing devices, cause the one or more computing devices to perform operations, the operations comprising:

obtaining an input dataset, wherein the input dataset comprises phoneme data and speaker metadata;

processing the speaker metadata with a first machine-learned model to determine a speaker embedding in a learned embedding space;

processing the phoneme data and the speaker embedding with a second machine-learned model to generate predicted speech data; and providing the predicted speech data, wherein the predicted speech data comprises data descriptive of one or more sound waves, wherein the predicted speech data differs from a plurality of training speech examples associated with a plurality of training datasets used to train the first machine-learned model and the second machine-learned model.

19. The one or more non-transitory computer-readable media of claim 18, wherein the speaker metadata comprises user-selected data associated with a desired speaker.

20. The one or more non-transitory computer-readable media of claim 18, wherein the speaker metadata comprises language data, region data, and gender data.

* * * * *